United States Patent [19]

Minoura et al.

[11] Patent Number: 5,224,327
[45] Date of Patent: Jul. 6, 1993

[54] LAWN MOWER HAVING A BLOWER FOR TRANSPORTING GRASS CLIPPINGS TO A GRASS CATCHER

[75] Inventors: Akira Minoura; Masagi Kure; Yoji Fujiwara; Masatake Murakawa; Masatsugu Tone; Mikio Yuki, all of Sakai, Japan

[73] Assignee: Kubota Corporation, Osaka, Japan

[21] Appl. No.: 902,605

[22] Filed: Jun. 23, 1992

[30] Foreign Application Priority Data

Jul. 11, 1991 [JP] Japan .............................. 3-170774
Jul. 11, 1991 [JP] Japan .............................. 3-170775
Jul. 11, 1991 [JP] Japan .............................. 3-170776

[51] Int. Cl.⁵ .......................................... A01D 34/70
[52] U.S. Cl. ........................... 56/13.3; 56/16.6; 56/202
[58] Field of Search ................ 56/13.3, 13.4, 16.6, 56/202

[56] References Cited

U.S. PATENT DOCUMENTS

| | | | |
|---|---|---|---|
| 2,920,435 | 1/1960 | Vallone | 56/13.3 |
| 3,065,588 | 11/1962 | Shaw | 56/13.4 |
| 4,081,947 | 4/1978 | Szymanis | 56/202 |
| 4,114,353 | 9/1978 | Ansbaugh et al. | 56/13.3 |
| 4,711,073 | 12/1987 | Freier, Jr. et al. | 56/13.3 |
| 4,996,829 | 3/1991 | Saitoh et al. | 56/13.3 |

Primary Examiner—David J. Bagnell
Attorney, Agent, or Firm—Jordan and Hamburg

[57] ABSTRACT

A lawn mower includes a blade housing enclosing grass cutting blades and having a lateral discharge opening, a blower unit connected to the discharge opening, and a duct connected to the blower unit for transporting grass clippings to a grass catcher. The blower unit includes an elbow-like lower blower housing connected to the blade housing, an upper blower housing having a substantially vertical cylindrical side wall connected to the duct, and an impeller mounted in the upper blower housing to be rotatable about a vertical axis. The impeller has a plane of rotation above a plane of rotation of the blades. The lower blower housing includes a flange for connection to the upper blower housing. The flange has an opening elongated in a direction along a passage defined by the two blower housings. This opening has width approximately half of the diameter of the impeller.

7 Claims, 9 Drawing Sheets

LAWN MOWER HAVING A BLOWER FOR TRANSPORTING GRASS CLIPPINGS TO A GRASS CATCHER

BACKGROUND OF THE INVENTION

1. Field of the Invention

The present invention relates to a device for transporting grass clippings from a discharge opening defined laterally of a housing of a grass cutting unit supported under a vehicle body to a grass catcher through a duct, for example. More particularly, the invention relates to a grass transport device having an impeller and attached to a housing of grass cutting blades.

2. Description of the Related Art

A known grass transport device as noted above is disclosed in U.S. Pat. No. 4,114,353, for example. This transport device is disposed outside and adjacent a grass discharge opening defined in a housing of a 3-spindle type cutting unit, and includes an impeller rotatable about a vertical axis. The impeller occupies an entire width of a passage extending from the grass discharge opening to a transport duct. However, the impeller achieves only an insufficient transporting efficiency in that only about one fourth of a total locus area of rotation of the impeller actually contributes to the grass transport.

A different transport device is known from U.S. Pat. No. 4,711,073, in which a grass transporting impeller is disposed in a higher position than grass cutting blades. In this prior construction, a blade housing has an upper wall thereof extending outwardly beyond a locus of rotation of the impeller, whereby grass clippings from the blade housing are guided to regions outwardly of the locus of rotation of the impeller. Since grass clippings are drawn by using only a discharging force of the impeller, air currents generated peripherally of the impeller suppress upward air currents. This results in the inconvenience of the grass clippings tending to stagnate in an ascending passage.

SUMMARY OF THE INVENTION

The object of the present invention is to provide a lawn mower having a grass transport device with an impeller disposed in a higher position than grass cutting blades, which assures smooth flows of grass clippings from a blade housing to the impeller.

The above object is fulfilled, according to the present invention, by a lawn mower comprising a blower including an impeller having a locus of rotation higher than loci of rotation of grass cutting blades mounted in a blade housing, in which a blower housing defines a transition opening in a lower region thereof between a discharge opening of the blade housing and a lower region of the impeller, the transition opening being opposed to a central region of the impeller.

According to this construction, a region of the opening opposed to the central region of the impeller is under the influence of a negative pressure occurring centrally of the impeller due to a difference in peripheral speed between peripheral parts and inner parts of the impeller. Consequently, grass clippings are drawn from the blade housing through the opening to be accelerated by the impeller for exit through a discharge opening of the blower housing.

In a preferred embodiment of the invention, the above opening is elongated in a direction along grass clipping flows. This construction is effective to promote smooth flows of the grass clippings from a lower position of the blower housing through the opening to the discharge opening of the blower housing.

Other features and advantages of the present invention will be apparent from the following description of the preferred embodiments taken with reference to the drawings.

DETAILED DESCRIPTION OF THE PREFERRED EMBODIMENTS

Figure 1:
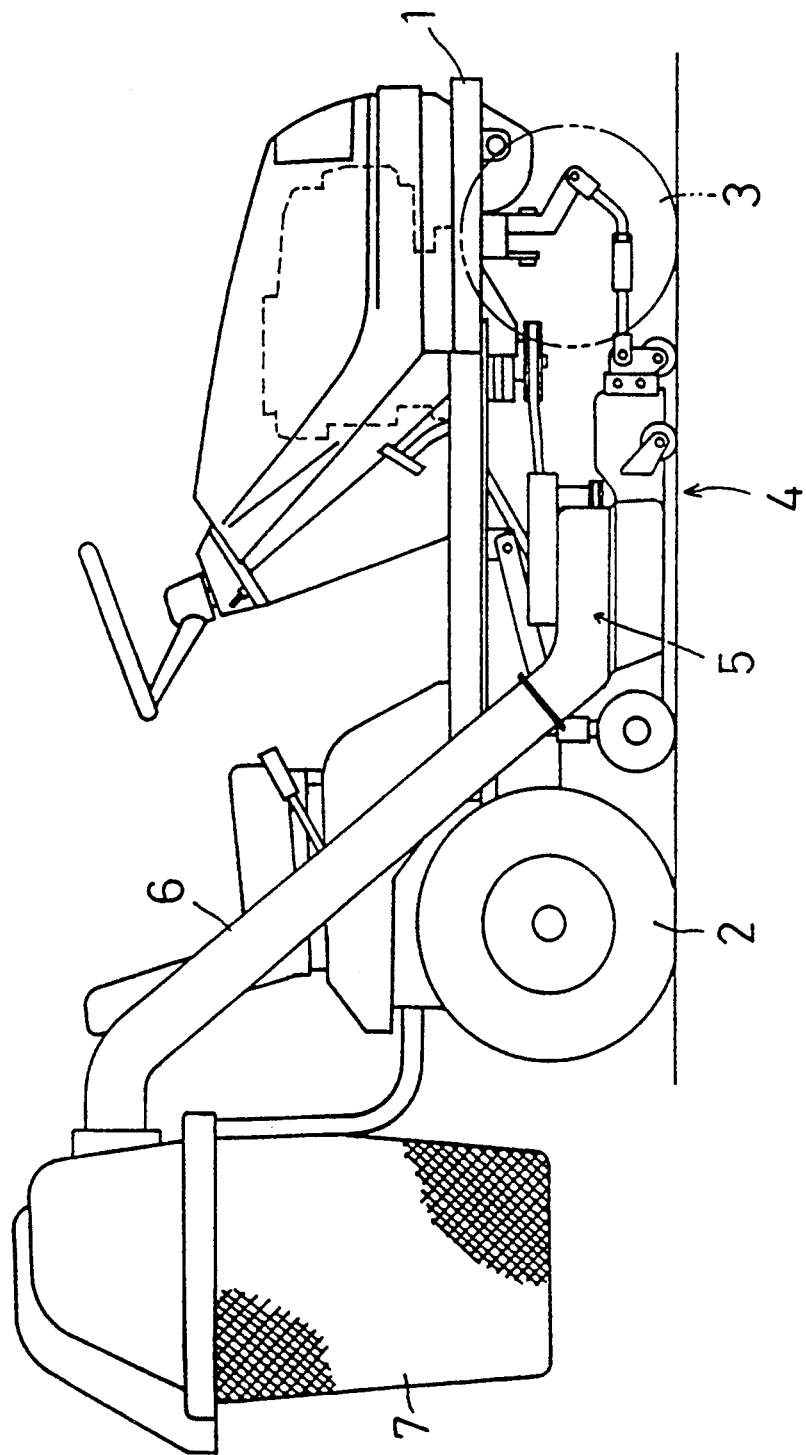
FIG. 1 is a side elevation of a riding lawn mower.

FIG. 1 shows a midmount type riding lawn mower. The mower has a vehicle frame 1 supported on rear wheels 2 and front wheels 3. The vehicle frame 1 has a grass cutting unit 4 suspended therefrom between the rear wheels 2 and front wheels 3. The grass cutting unit 4 carries a blower unit 5 mounted on an upper position thereof and connected through a transport duct 6 to a grass catcher 7 mounted rearwardly of the vehicle frame 1. According to this construction, grass cut by the grass cutting unit 4 is transported as it is to the grass catcher 7.

Figure 2:
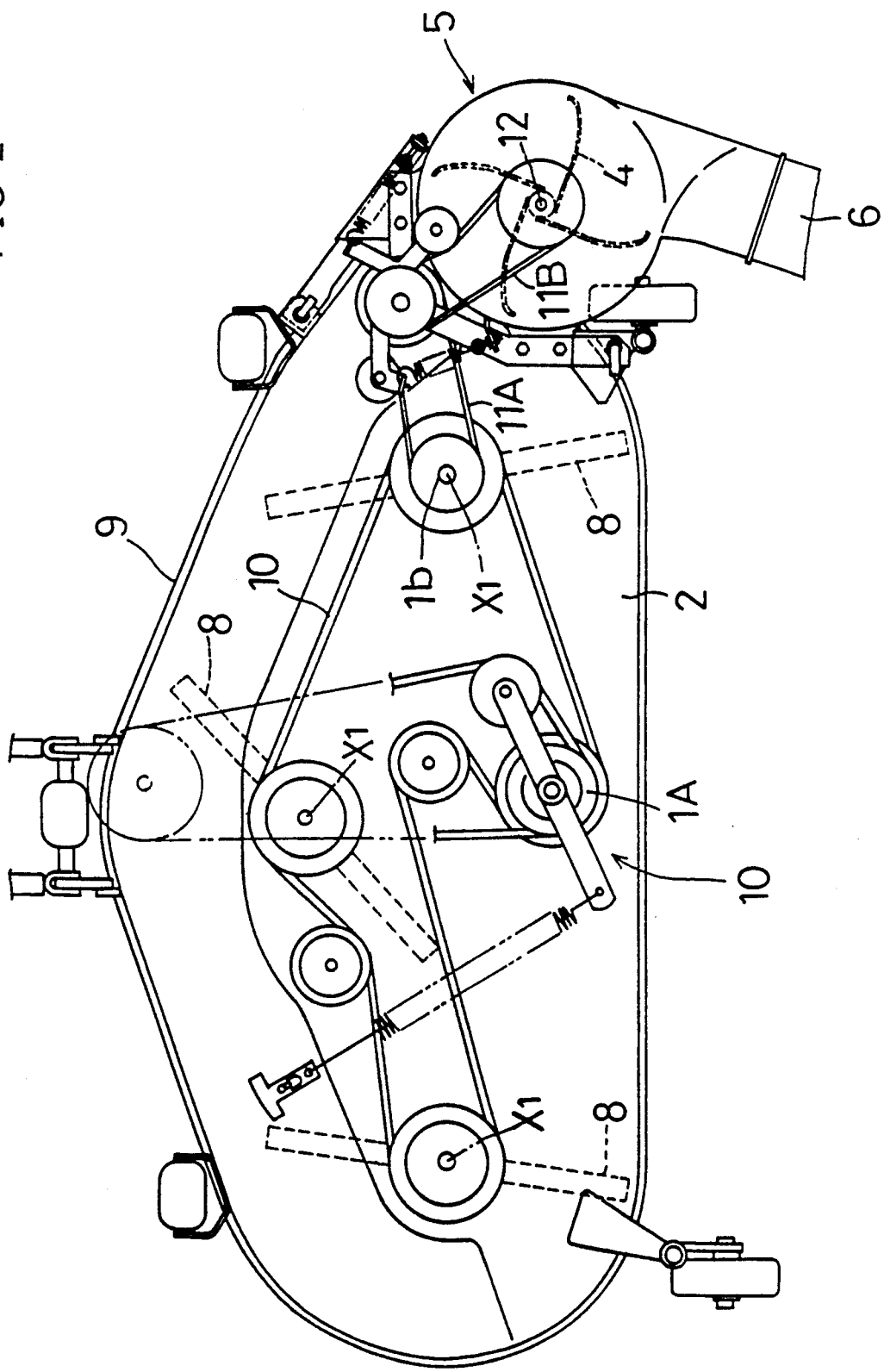
FIG. 2 is a plan view of a grass cutting unit.

As shown in FIG. 2, the grass cutting unit 4 includes three cutting blades 8 rotatable on vertical axes, a blade housing 9 enclosing the blades 8, and a belt transmission 10 for driving the blades 8. The belt transmission 10 is driven by an engine. The drive arrangement is known in the art, and will not be described herein.

Figure 3:
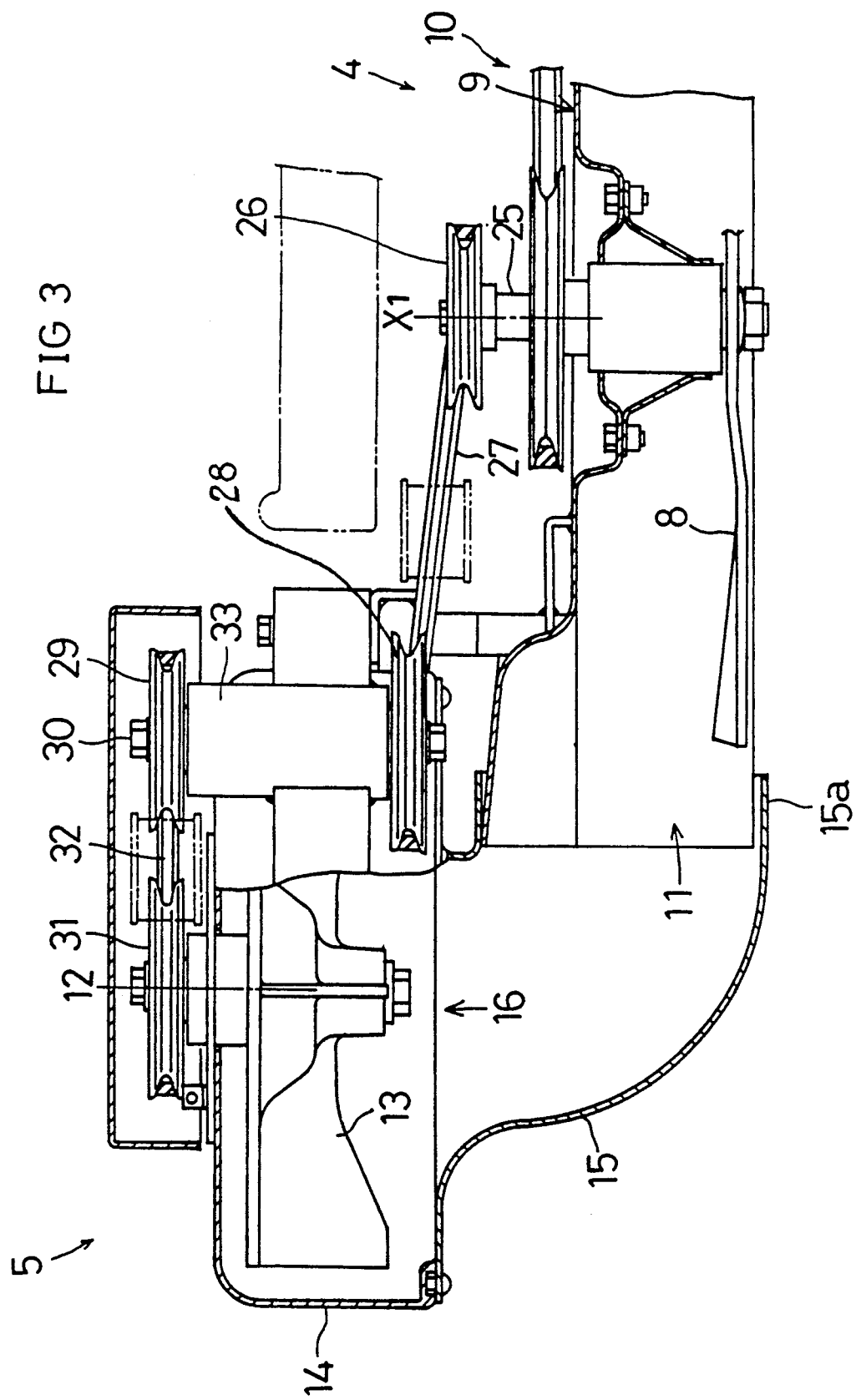
FIG. 3 is a view in vertical section of a portion of the grass cutting unit.
Figure 4:
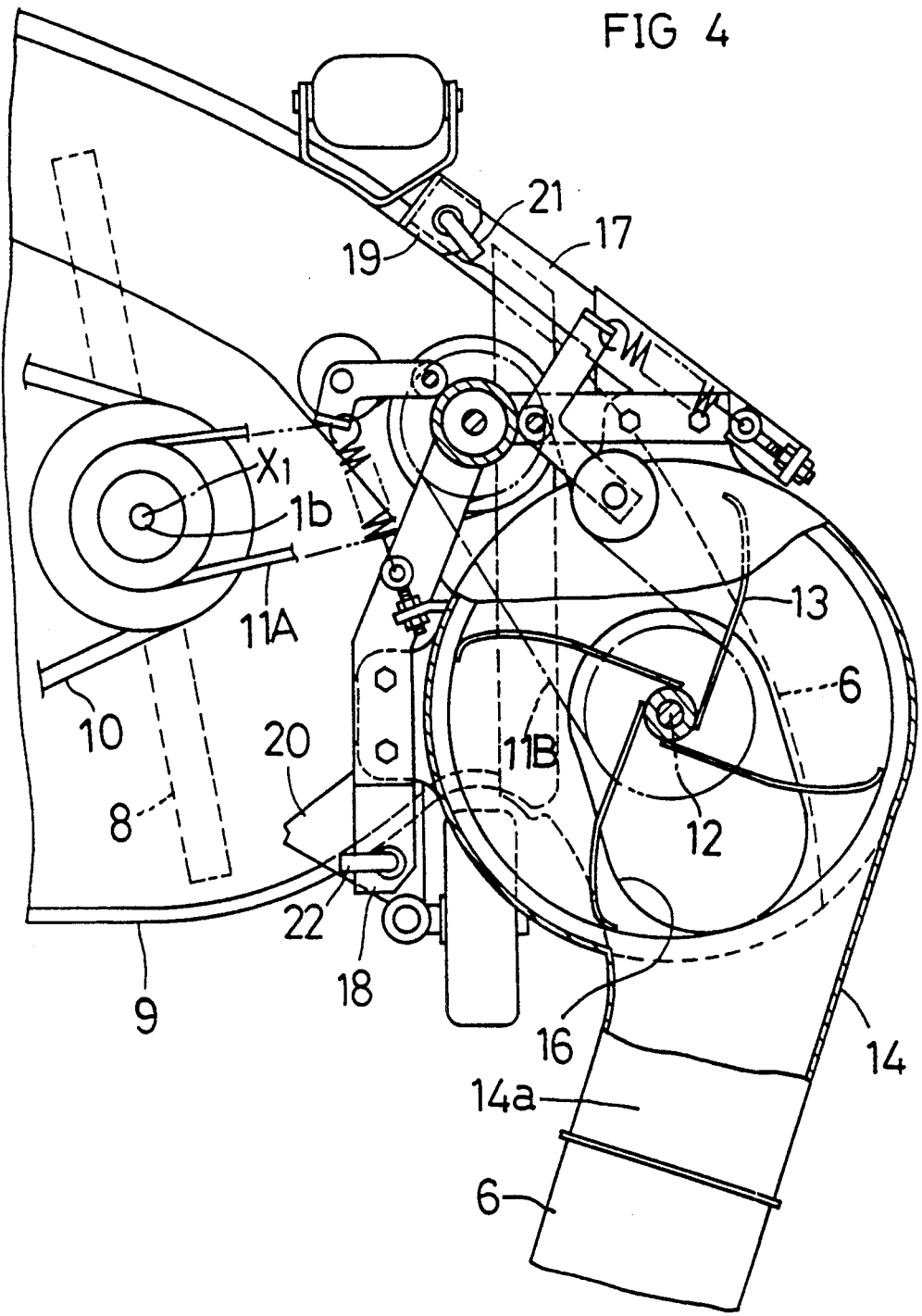
FIG. 4 is a sectional plan view of the portion of the grass cutting unit shown in FIG. 3.

As shown in FIGS. 3 and 4, the blower unit 5 for transporting grass clippings to the grass catcher 7 is connected to a discharge opening 11 defined laterally of the blade housing 9. The blower unit 5 includes an impeller 13 rotatable about a vertical rotary shaft 12, an upper blower housing 14 enclosing the impeller 13, and a lower blower housing 15 connected to a bottom of the upper blower housing 14. The lower blower housing 15 is bent approximately 90 degrees like an elbow to define a horizontal extension. This extension includes a first connection port 15a formed at an end thereof and coupled to the discharge opening 11 of the blade housing 9. The upper blower housing 14 includes a cylindrical side wall and a ceiling wall. As best shown in FIG. 4, part of the side wall is cut out to define a tangential extension, with a second connection port 14a formed at an end of the extension and coupled to the transport duct 6.

The blower unit 5 is attached to the grass cutting unit 4 such that the impeller 13 has a locus of rotation at a higher level than loci of rotation of the cutting blades 8 of the grass cutting unit 4. This is achieved by appropriately selecting a height of the elbow-like lower blower housing 15.

Figure 5:
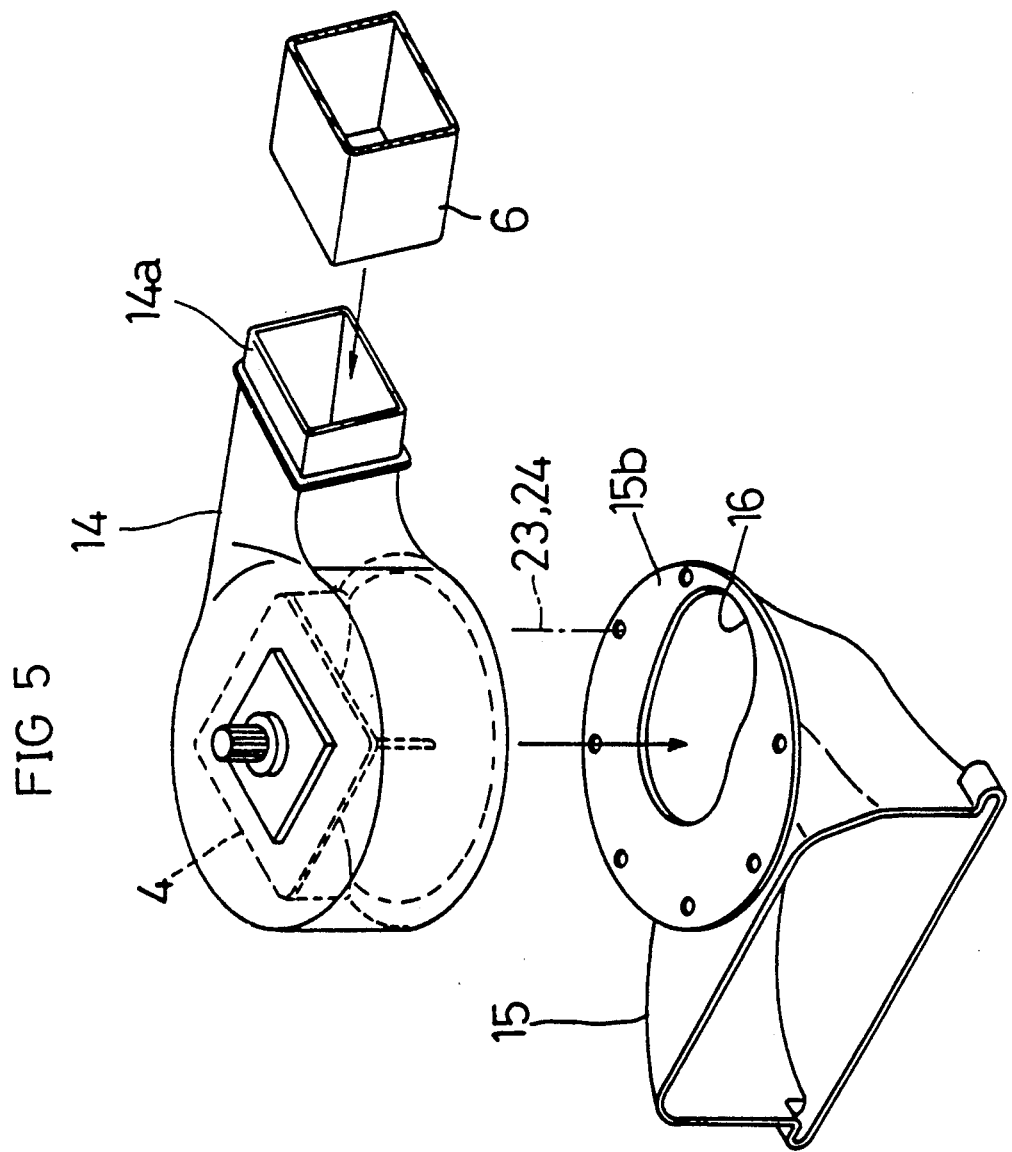
FIG. 5 is an exploded perspective view of the portion shown in FIG. 3.

As seen from FIG. 5, the end of the lower blower housing 15 opposed to the upper blower housing 14 defines a horizontal surface with bores arranged at intervals peripherally thereof for receiving connecting bolts, and a center opening 16 providing a region of transition to the upper blower housing 14. As best seen from FIG. 4, the opening 16 has an elongated shape formed by moving a circle centered on the rotary shaft 12 of the impeller 13 and having a diameter approximately half of a diameter of the impeller 13, parallel along a centerline of a passage from the discharge opening 11 of the blade housing 9 to the second connection port 14a of the upper blower housing 14.

Figure 6:
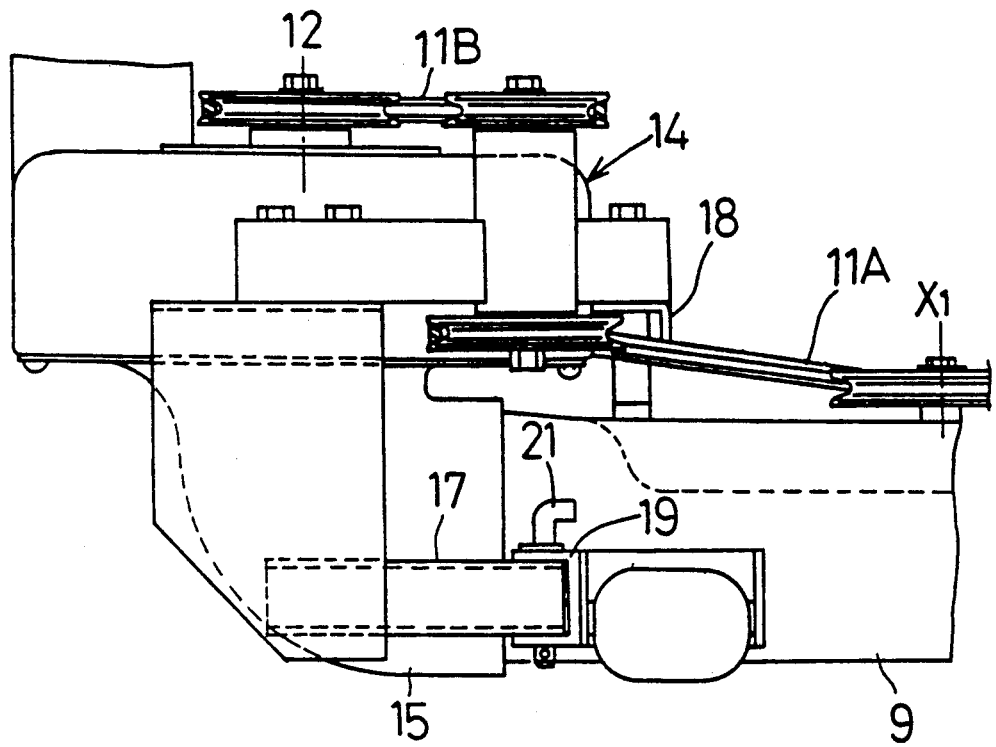
FIG. 6 is a rear view of the portion shown in FIG. 3.
Figure 7:
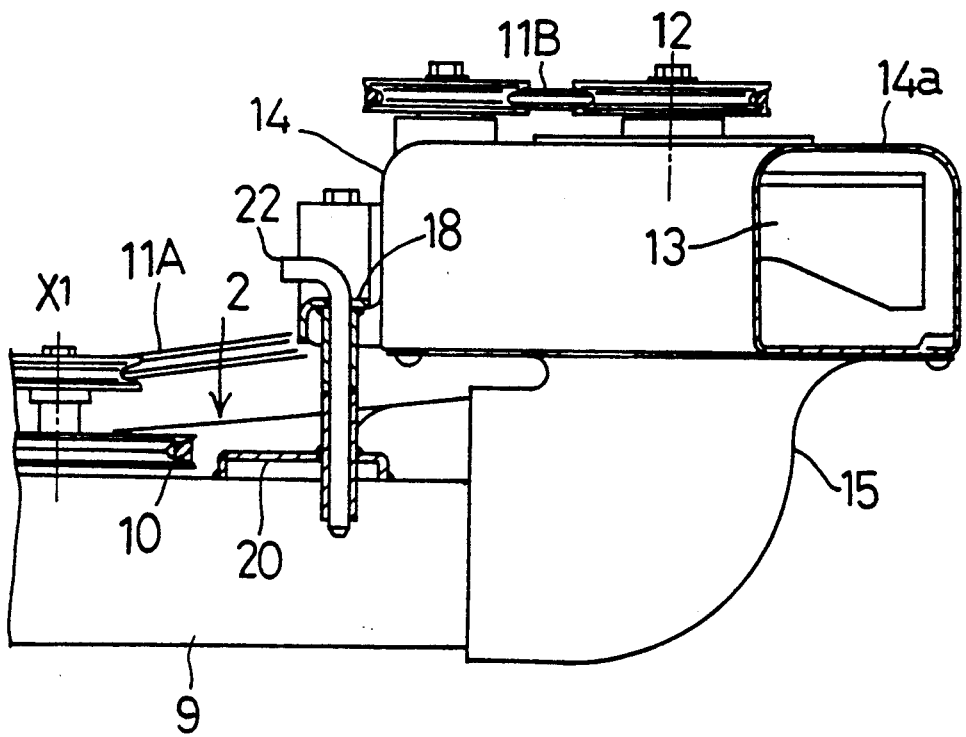
FIG. 7 is a front view, partly in section, of the portion shown in FIG. 3, FIGS. 8A through 8D are fragmentary sectional views showing varied connection structures between an upper blower housing and a lower blower housing.
Figure 8A:
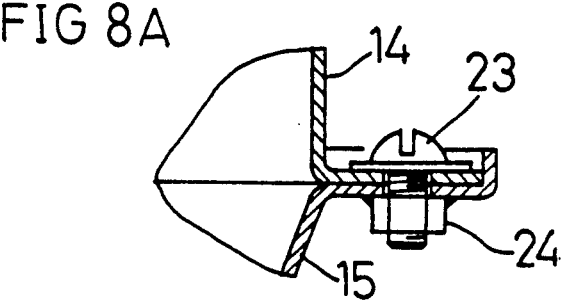
Figure 8B:
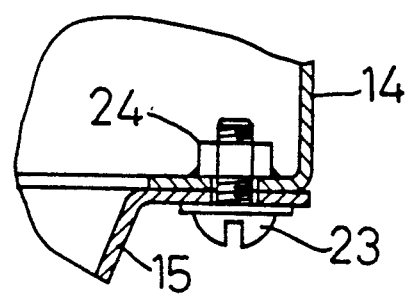
Figure 8C:
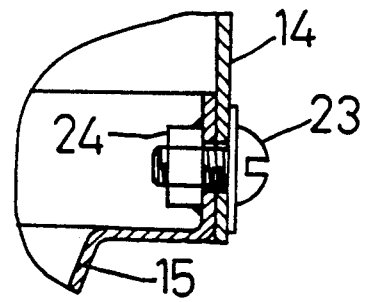
Figure 8D:
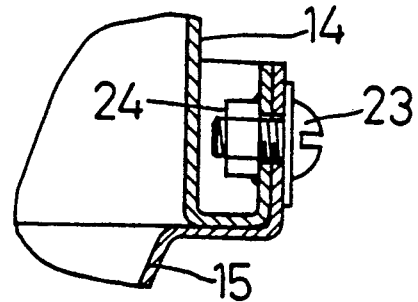

The upper blower housing 14 and lower blower housing 15 are interconnected in advance to form an integral unit. The integrated blower housing is detachably attached to the blade housing 9 through a lock pin 21 interconnecting a mounting stay 17 secured to the blower housing and a bracket 19 secured to the blade housing 9 as shown in FIG. 6, and through a lock pin 22 interconnecting a mounting stay 18 secured to the blower housing and a bracket 20 secured to the blade housing 9 as shown in FIG. 7.

As schematically shown in FIG. 5, the lower blower housing 15 and upper blower housing 14 are interconnected through bolts 23 and nuts 24 which interconnect a flange extending outwardly of the lower blower housing 15 and a folded flange of the upper blower housing 14. The upper blower housing 14 is formed of a synthetic resin so that the nuts 24 may be embedded in a wall thereof in order to avoid disturbance of interior air flows. The lower blower housing 15 may also be formed of the synthetic resin. The upper and lower blower housings 14 and 15 may be formed of sheet metal and interconnected in varied ways as shown in FIGS. 8A through 8D.

Figure 9:
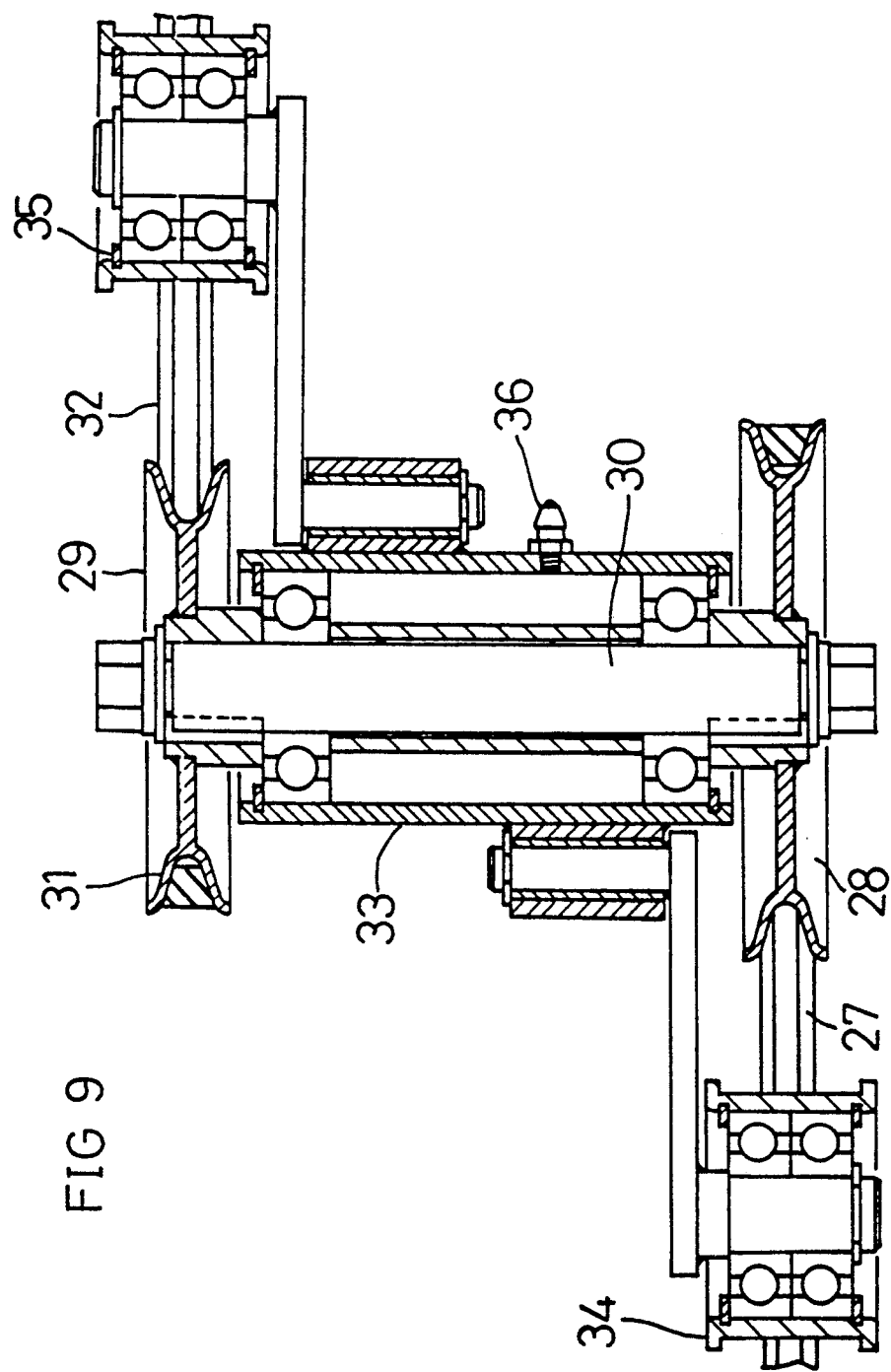
FIG. 9 is a sectional view of a vertical intermediate transmission shaft.

While the cutting blades 8 are driven through the belt transmission 10 provided on the blade housing 9, the impeller 13 of the blower unit 5 is driven by power taken out of the belt transmission 10. Specifically, as shown in FIGS. 3 and 9, the impeller 13 is driven through a belt 27 wound around a pulley 26 mounted on a blade shaft 25 adjacent the discharge opening 11 and extending along and adjacent an upper surface of the blade housing 9, a vertical intermediate transmission shaft 30 disposed adjacent the blower housing, i.e. adjacent the rotary shaft 12 of the impeller 13, and having a lower pulley 28 and an upper pulley 29 and a pulley 31 mounted on the rotary shaft 12 and extending along and adjacent an upper surface of the upper blower housing 14.

The vertical intermediate transmission shaft 30 is mounted in a tubular support case 33 having tension rollers 34 and 35 pivotally connected thereto for acting on the belts 27 and 32, respectively. The tubular support case 33 includes a grease nipple 36 for filling grease between the vertical intermediate transmission shaft 30 and tubular support case 33.

Figure 10:
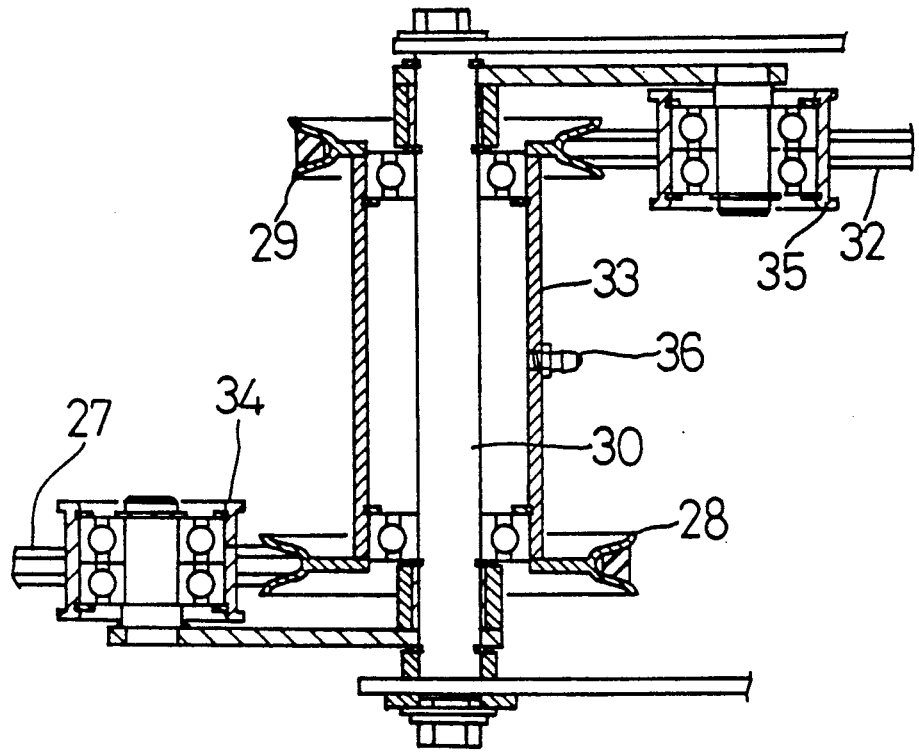
FIG. 10 is a sectional view of a vertical intermediate transmission shaft in another embodiment.

As shown in FIG. 10, the vertical intermediate transmission shaft 30 may be formed tubular with the lower pulley 28 and upper pulley 29 attached thereto.

Figure 11:
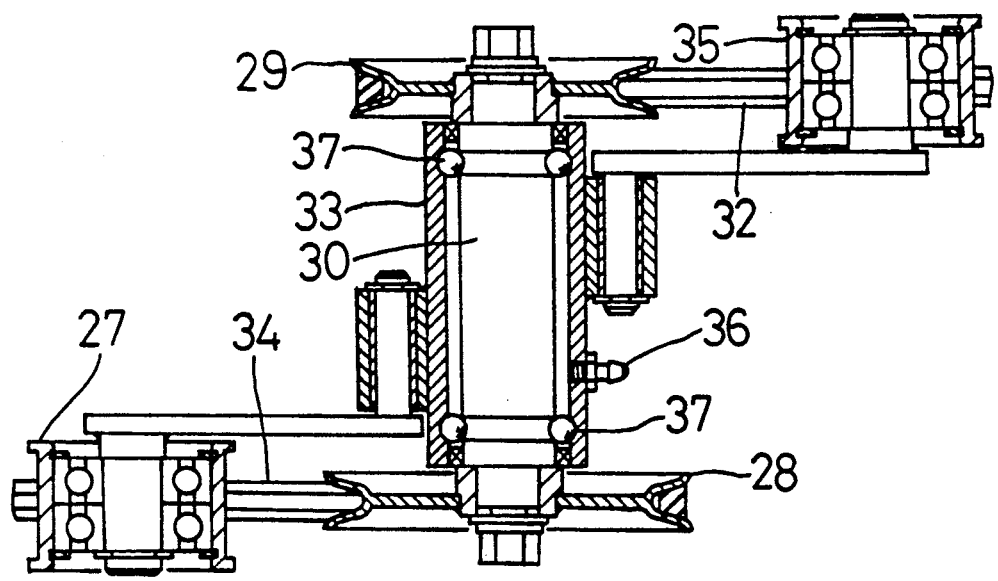
FIG. 11 is a sectional view of a vertical intermediate transmission shaft in a further embodiment.

Further, as shown in FIG. 11, balls 37 may be arranged directly between the vertical intermediate transmission shaft 30 and tubular support case 33, the shaft 30 and case 33 acting as inner races and outer races of ball bearings, to simplify the structure.

In the foregoing embodiment, the flange on the upper surface of the elbow type lower blower housing 15 defines the opening 16 elongated from the center of rotation of the impeller 13 toward the second connection port 14a of the upper blower housing 14. Instead, the elongated opening 16 may be formed in a bottom surface of the upper blower housing 14.

What is claimed is:

1. A lawn mower comprising:
a frame supported by wheels:
a blade housing supported by said frame and having a lateral discharge opening;
blade means mounted in said blade housing for cutting grass;
means for driving said blade means;
duct means for transporting grass cut by said blade means; and
blower means mounted between said lateral discharge opening and said duct means and defining a passage from said lateral discharge opening to said duct means, said blower means including:
a blower housing having a first connection port connectable to said lateral discharge opening, and a second connection port connectable to said duct means;
an impeller mounted in said blower housing;
means for rotating said impeller about a vertical axis;
said impeller being disposed such that a locus plane of rotation of said impeller is above a locus plane of rotation of said blade means; and
a cross portion disposed below said impeller and traversing said passage, said cross portion defining an opening opposed to a region of the axis of said impeller for drawing the grass cut by said blade means.

2. A lawn mower as claimed in claim 1, wherein said opening of said cross portion has a width traversing said passage which width is approximately half of a diameter of said impeller.

3. A lawn mower as claimed in claim 2, wherein said opening of said cross portion is elongated in a direction along said passage.

4. A lawn mower as claimed in claim 1, wherein said blower housing is divided into a lower housing portion including said first connection port, and an upper housing portion including said second connection port, said cross portion being formed as a flange for interconnecting said upper housing portion and said lower housing portion.

5. A lawn mower as claimed in claim 1, wherein said means for rotating said impeller includes an input pulley mounted on an upper position of a rotary shaft of said impeller, an output pulley mounted on a rotary shaft of said blade means, and belt transmission means for transmitting power from said output pulley to said input pulley.

6. A lawn mower as claimed in claim 5, wherein said belt transmission means includes intermediate pulley means having two pulleys vertically spaced apart from each other.

7. A lawn mower comprising:
a frame supported by wheels;

a blade housing supported by said frame and having a lateral discharge opening;

blade means mounted in said blade housing for cutting grass;

means for driving said blade means;

duct means for transporting grass cut by said blade means; and blower means mounted between said lateral discharge opening and said duct means and defining a passage from said lateral discharge opening to said duct means, said blower means including:

a lower blower housing having a first connection port connectable to said lateral discharge opening;

an upper blower housing having a substantially vertical cylindrical side wall, and a second connection port defined in a position of said side wall to be connectable to said duct means;

an impeller mounted in said upper blower housing; and means for rotating said impeller about a vertical axis;

said impeller being disposed such that a locus plane of rotation of said impeller is above a locus plane of rotation of said blade means; and a region of transition from said lower blower housing to said upper blower housing, said region extending in a direction along said passage and having a width about the axis of said impeller and traversing said passage which width is approximately half of a diameter of said impeller.

* * * * *